United States Patent [19]

Hosaka et al.

[11] Patent Number: 4,985,716
[45] Date of Patent: Jan. 15, 1991

[54] APPARATUS FOR GENERATING IONS USING LOW SIGNAL VOLTAGE

[75] Inventors: Yasuo Hosaka, Tokyo; Tadayoshi Ohno, Kawasaki, both of Japan

[73] Assignee: Kabushiki Kaisha Toshiba, Kawasaki, Japan

[21] Appl. No.: 434,424

[22] Filed: Nov. 13, 1989

[30] Foreign Application Priority Data

Nov. 10, 1988 [JP]   Japan ................................ 63-282500

[51] Int. Cl.⁵ ............................................. G01D 15/06
[52] U.S. Cl. ................................................... 346/159
[58] Field of Search ........................................ 346/159

[56] References Cited
U.S. PATENT DOCUMENTS 4,155,093  5/1979  Fotland et al. ...................... 346/159
4,160,257  7/1979  Carrish .............................. 346/159
4,491,855  1/1985  Fujii et al. ......................... 346/159

Primary Examiner—Donald A. Griffin
Attorney, Agent, or Firm—Foley & Lardner, Schwartz, Jeffery, Schwaab, Mack, Blumenthal & Evans

[57] ABSTRACT

An apparatus for generating ions which can be operated by a low signal voltage. The apparatus includes, a first voltage source for applying to a first electrode a first voltage slightly less than a critical voltage for constant ion generation; and a second voltage source for applying to a second electrode a second voltage significantly less than the first voltage having such an amplitude that a total of the first and the second voltages exceeds the critical voltage such that the ion generation by the first electrode takes place only while the second voltage is being applied to the second electrode.

10 Claims, 16 Drawing Sheets

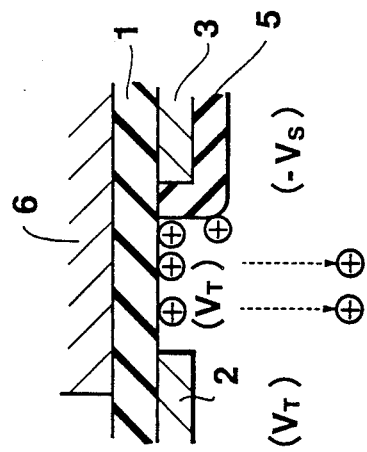
FIG.12 (A)
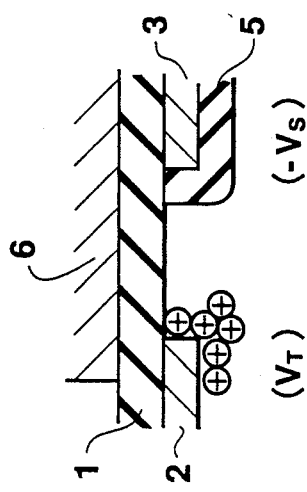
FIG.12 (B)
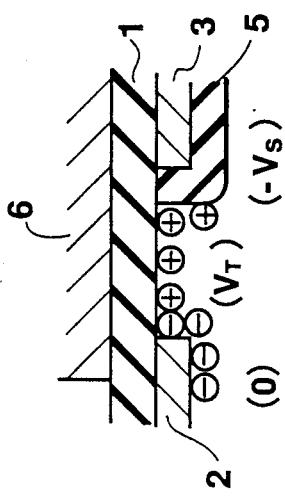
FIG.12 (C)
FIG.12 (D)

APPARATUS FOR GENERATING IONS USING LOW SIGNAL VOLTAGE

BACKGROUND OF THE INVENTION

1. Field of the Invention

The present invention relates to an apparatus for generating ions suitable as a source of corona ions for forming electrostatic latent images in an electrostatic printer.

2. Description of the Background Art

In a conventional apparatus for generating ions to be used as a source of corona ions for forming electrostatic latent images in an electrostatic printer, there is one such apparatus comprises a corona charger or a solidified ion generation substrate, and an ion current control electrode on which a multiplicity of slits corresponding to recording dots are provided. In this apparatus, a flow of ion currents towards a recording medium is allowed or disallowed by controlling a high voltage applied to the ion current control electrode. In particular, with the solidified ion generating substrate, it has been possible to generate highly density corona ions suitable for high speed recording.

This type of an apparatus for generating ions is disclosed in U.S. Pat. Ser. No. 4,155,093, which is schematically shown in FIG. 1.

As shown in FIG. 1, two electrodes 102 and 103 are provided above and below an insulative substrate 101, of which the electrode 103 has an incision or hole 104 for increasing a field concentration so as to generate corona ions more easily. Between these electrodes 102 and 103, an alternating voltage 105 is applied, so that a strong alternating field is created in the incision or hole 104 by which a high density of positive and negative ions are generated. Of these generated ions, only the negatively charged ones are selectively allowed to flow towards acceleration electrodes 107 as ion currents by means of a control voltage 106 to be applied to the electrode 103. These ion currents are accelerated by a voltage 108 applied to the acceleration electrodes 107 so as to reach an insulative recording medium 109 on which an electrostatic latent image is to be formed.

A so called ion recording head is a collection of as many apparatuses for generating ions of the type described above as a number of picture elements required. Such an ion recording head is known to have the following drawbacks. First, because both of the positive and negative corona ions are steadily generated by the electrodes for generating ions, a lifetime of the recording medium is shortened and at the same time an ozone odor is produced as the corona ions leak out. Second, the control voltage to be applied to the control electrode is required to be a high voltage of over 150 V. As a consequence, since a control IC for controlling such a high voltage inevitably occupies a large mounting area which is prohibitive for a highly condensed implementation, the realization of a highly compact ion recording head has been difficult.

As a method of reducing the control voltage, a proposition was made in Japanese Patent Application Laid open No. S61-255870 a control voltage was applied in a direction perpendicular to the slits, for the corona ions to pass through. According to this proposition, it is possible to reduce the control voltage to a low of approximately 30 V. However, since it is necessary to provide additional electrodes for producing a field perpendicular to the slits, a structure is further complicated. This gives rise to a limitation in terms of a mounting area, which in turn gives rise to limitations on the resolution of the image and the number of picture elements that can be incorporated.

In addition to these problems of conventional apparatuses for generating ions, there is a general problem associated with any apparatus for generating ions. Namely, ion generation is affected by the environmental conditions of the apparatus a critical voltage for the corona ion generation and the amount of corona ion currents changes, and the corona ion generation becomes uneven, as the environmental condition of the apparatus changes. Among the environmental conditions that affect corona ion generation, the temperature affects the critical voltage for the corona ion generation, whereas the atmospheric pressure affects the amount of the corona ion currents and the critical voltage. Also, vapor condensation on the electrode for generating ions occurring at high humidity can prevent corona ion generation altogether.

More specifically, the effects of environmental conditions on the corona ion generation by an apparatus for generating ions can be analyzed as follows.

When a pair of parallel electrodes in the apparatus which are provided on an insulator are approximated by a pair of parallel wires, the critical voltage for corona ion generation is given by:

$$V_T = 30m\delta \left(1 + \frac{0.301}{\sqrt{a\delta}}\right) a \cdot \ln\left(\frac{L}{a}\right)(\text{kV}) \quad (1)$$

$$\delta = \frac{3.92P}{273 + T} \quad (2)$$

where 2a is equal to a thickness of the electrodes (cm), L is a distance between the electrodes (cm), P is an atmospheric pressure (cmHg), T is a temperature (0), m is a coefficient depending on the cleanness of the surface of the electrodes, which is equal to 1 when the surface is clean (See R. M. Shaffert "Electrophotography", p.235, Focal Press, London, 1980). According to these equations (1) and (2), for the apparatus where L=100 micron and a=10 micron, the critical voltage $V_T$ is roughly 650 V at 250 and 76 cmHg.

The dependence of the critical voltage on temperature is shown in FIG. 2. As can be seen from FIG. 2, the critical voltage at 0° is roughly 60 V higher than that at 25°. In fact, for a given ion current, the control voltage must be roughly 60 V higher at 0° than at 25°.

The dependence of the critical voltage on atmospheric pressure is shown in FIG. 3. As can be seen from FIG. 3, the critical voltage at 71 cmHg (950 mb) is roughly 40 V lower than that at 76 cmHg (1013 mb). In fact, for a given amount of ion currents, the control voltage needs to be roughly 40 V lower at 71 cmHg than at 76 cmHg. Furthermore, because the mobility of the corona ions is inversely proportional to the atmospheric pressure, the amount of ion currents changes slightly, and accordingly there is a slight shift of curves in FIG. 3 as indicated by a one dot chain line.

Thus, the critical voltage for corona ion generation is greatly affected by the temperature and the atmospheric pressure, while the amount of corona ion currents is also affected by the atmospheric pressure to a smaller extent. It is to be noted that these environmental conditions usually do not change very much during a particular operation of the apparatus, so that once the operation is started out successfully, a fairly stable operation can be expected.

On the other hand, when vapor condensation on the electrode for generating ions occurs from high humidity, corona ion generation is prevented altogether. In this condition, if the control voltage is increased to approximately 900 V insulation by the air is lost, and the spark discharge occurs, as shown in FIG. 4, which in turn causes the breakdown of the electrodes.

In the apparatus for generating ions using a solidified ion generation substrate, resistor heat elements for removing the vapor condensation on the electrodes may be provided. Alternatively, a high frequency voltage which is lower than the critical voltage may be applied between the electrodes before operation, so as to heat up the electrodes through the insulator by the induction loss of the insulator, as disclosed in Japanese Patent Application Laid Open No. 63-18372.

An apparatus described in the last reference is schematically shown in FIG. 5. In this apparatus, a high frequency voltage is applied between a discharge electrode 111 on an inductive body 110 and an induction electrode 112 embedded in the inductive body 110 by a voltage source 113 controlled by a voltage controller 114 in order to generate corona ions, and either the generated positive and negative corona ions are selected by a bias voltage 114 as corona ions to charge a recording medium 116. In addition, a heater 117 is provided on the inductive body 110 in order to maintain the electrodes 111 and 112 at a constant temperature by controlling a heater power source 18 in accordance with the temperature of the electrodes 111 and 112 detected by a temperature detector 119. By means of these features, the temperature of the electrodes 111 and 112 is controlled to be constant as shown in FIG. 6.

Meanwhile, as shown in FIG. 7, a high frequency voltage $V_A$, which is less than the critical voltage $V_T$, is applied for a predetermined period of time between the electrodes 111 and 112 so as to accelerate heating by the heater 117 by the heat generation by the inductive body 110 due to the induction loss of the insulator. Thus, by maintaining the temperature of the apparatus above that of the environment, the vapor condensation on the electrodes 111 and 112 is removed, and then a control voltage $V_0$, which is greater than the critical voltage $V_T$, by $V_C$ is applied. These high frequency voltage $V_A$ and the control voltage $V_0$ are biased by the bias voltage $V_B$.

However, in this apparatus of FIG. 5, temperature control is not performed in accordance with the humidity, depending on which the amount of the vapor varies considerably. Moreover, whether the vapor is completely removed from the electrodes 111 and 112 is not checked at all.

Also, in this apparatus of FIG. 5, no attention is paid to any change in atmospheric temperature or atmospheric pressure, so that the apparatus is still greatly affected by environmental conditions.

As for a corona charger in which a high voltage is applied to a wire in order to generate corona ions, which has been widely used in conventional copy machines, no attention has been paid to the effects of environmental conditions, so that fluctuations in the quality of the copied images has been a general feature in conventional copy machines.

SUMMARY OF THE INVENTION

It is therefore an object of the present invention to provide an apparatus for generating ions, capable of preventing generation of extraneous corona ions, with which the lifetime of the recording medium can be extended, which has a simple structure and which can be operated by a low signal voltage for highly compact implementation.

It is also an object of the present invention to provide such an apparatus for generating ions capable of obtaining stable ion generation and ion currents, regardless of the environmental conditions such as temperature, atmospheric pressure, and humidity.

According to one aspect of the present invention there is provided an apparatus for generating ions, comprising: first electrode means for generating ions; first voltage source means for applying, to the first electrode means, a first voltage slightly less than a critical voltage for an ion generation constantly; second electrode means for starting the ion generation by the first electrode means, which is located in a vicinity of the first electrode means with a gap; and second voltage source means for applying, to the second electrode means, a second voltage significantly less than the first voltage having such an amplitude that the total of the first and the second voltages exceeds the critical voltage such that the ion generation by the first electrode means takes place only while the second voltage is being applied to the second electrode means.

According to another aspect of the present invention there is provided an apparatus for generating ions, comprising: first electrode means for generating ions; first voltage source means for applying, to the first electrode means, a first voltage; second electrode means for controllably starting the ion generation by the first electrode means, which is located in a vicinity of the first electrode means with a gap; second voltage source means for applying, to the second electrode means, a second voltage having such an amplitude that a total of the first and the second voltages exceeds a critical voltage for an ion generation such that the ion generation by the first electrode means takes place only when the second voltage is being applied to the second electrode means; additional electrode means for detecting the amount of ions generated by the first electrode means, which is located in a vicinity of the first electrode means with the same gap as the gap between the first and second electrode means, to which a third voltage greater than the critical voltage is applied; and means for controlling the direct voltage source of the first voltage source means and the second voltage source means in accordance with the amount of ions detected by the additional electrode means such that the first voltage and the second voltage have amplitudes appropriate for a prescribed desired ion generation by the first electrode means.

According to another aspect of the present invention there is provided an apparatus for generating ions, comprising: first electrode means for generating ions, first voltage source means for applying, to the first electrode means, a first voltage, comprising; an alternating voltage source for applying an alternating voltage; and a direct voltage source for applying a direct bias voltage such that the direct bias voltage gradually increases from zero to an appropriate amplitude; second electrode means for starting ion generation by the first electrode means, which is located in a vicinity of the first electrode means with a gap; and second voltage source means for applying, to the second electrode means, a second voltage having such an amplitude that a total of the first and the second voltages exceeds a critical voltage for an ion generation such that the ion generation by the first electrode means takes place only when the second voltage is being applied to the second electrode means.

Other features and advantages of the present invention will become apparent from the following description taken in conjunction with the accompanying drawings.

BRIEF DESCRIPTION OF THE DRAWINGS

FIGS. 12(A), (B), (C), and (D) are sequential illustrations of the ion recording head of the apparatus of FIG. 8 for explaining the corona ion generation process.

DETAILED DESCRIPTION OF THE PREFERRED EMBODIMENTS

Figure 1:
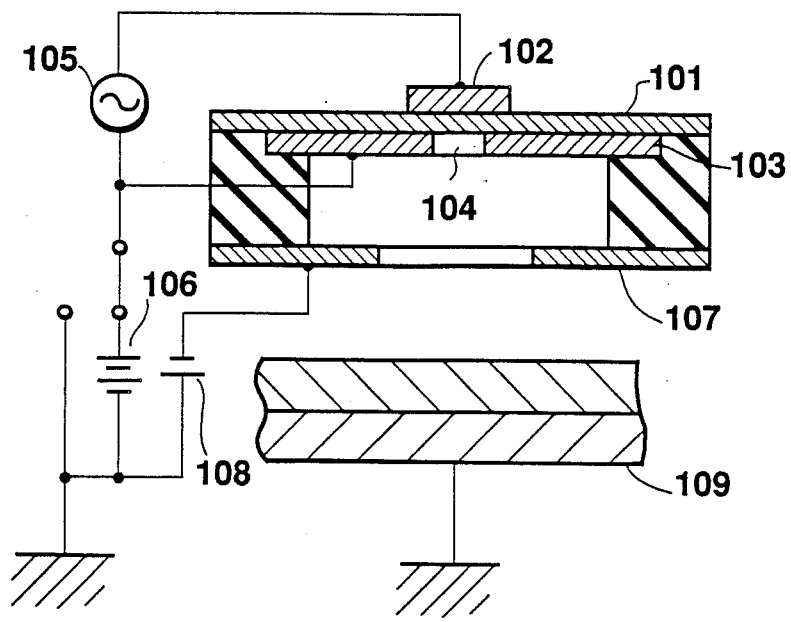
FIG. 1 is a schematic block diagram of a conventional apparatus for generating ions.
Figure 2:
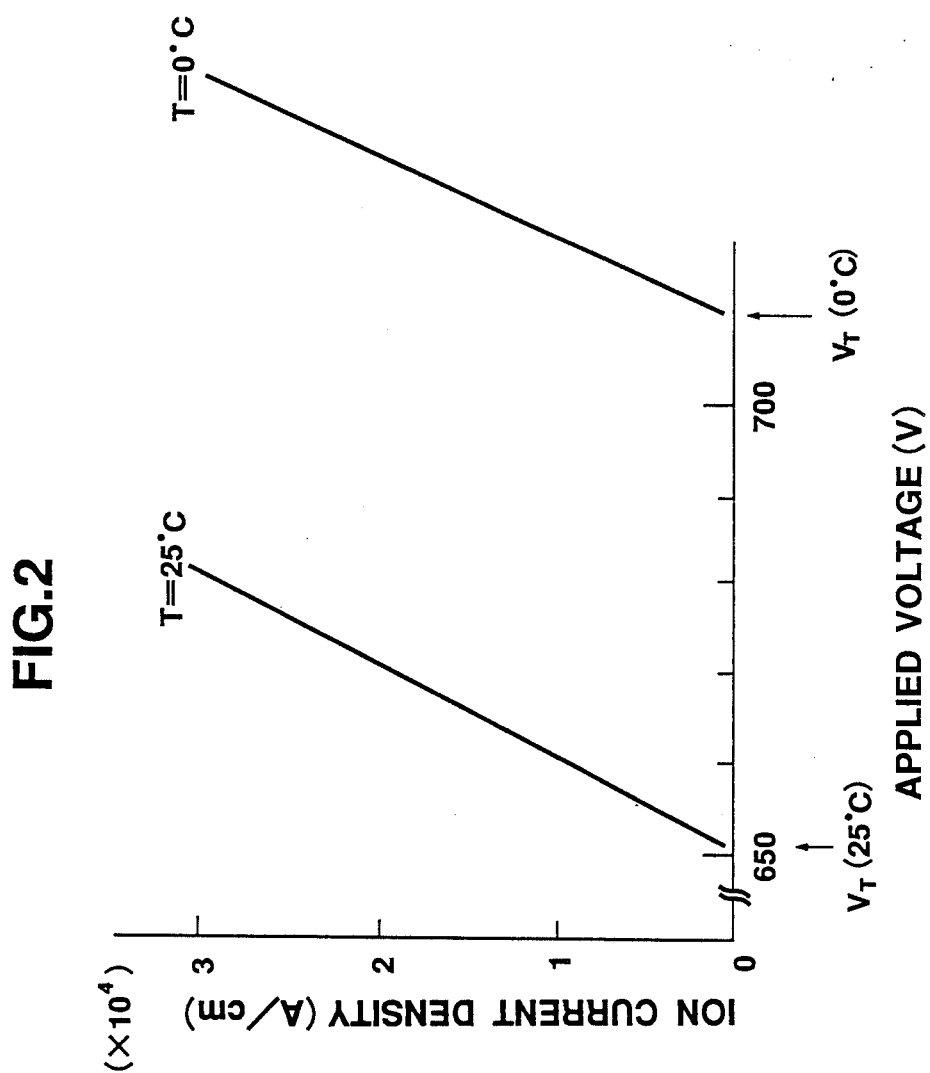
FIG. 2 is a graph of a ion current density versus a control voltage for different temperatures.
Figure 3:
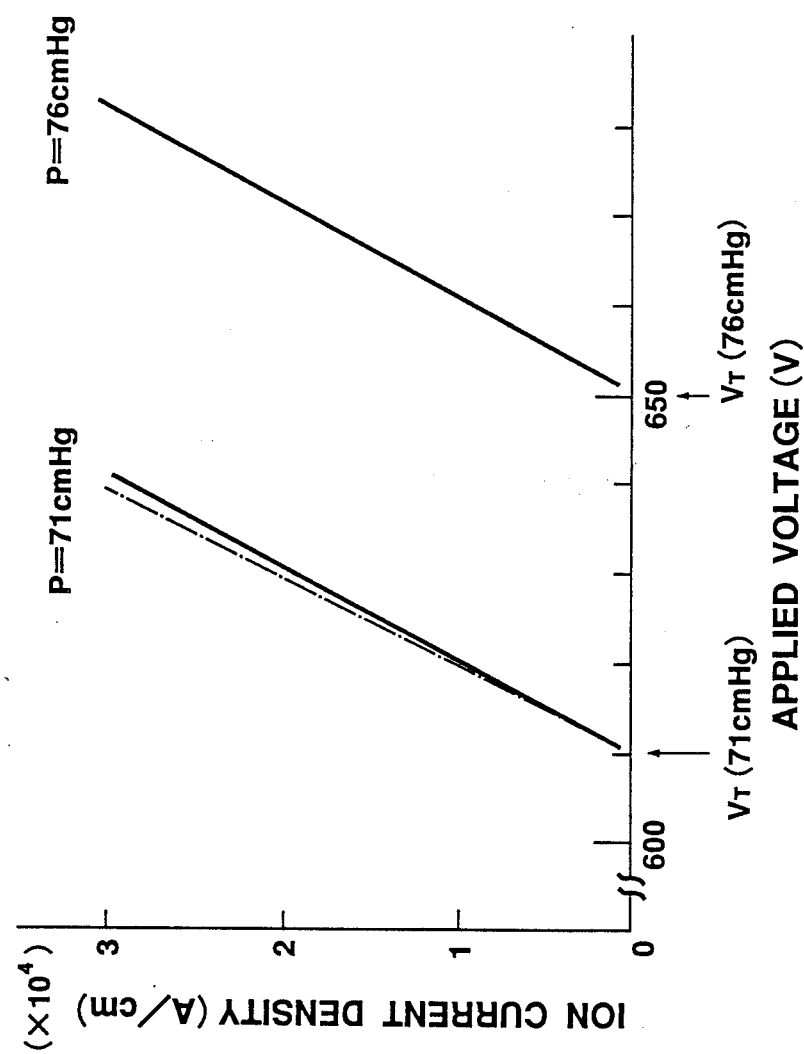
FIG. 3 is a graph of a ion current density versus a control voltage for different atmospheric pressure.
Figure 4:
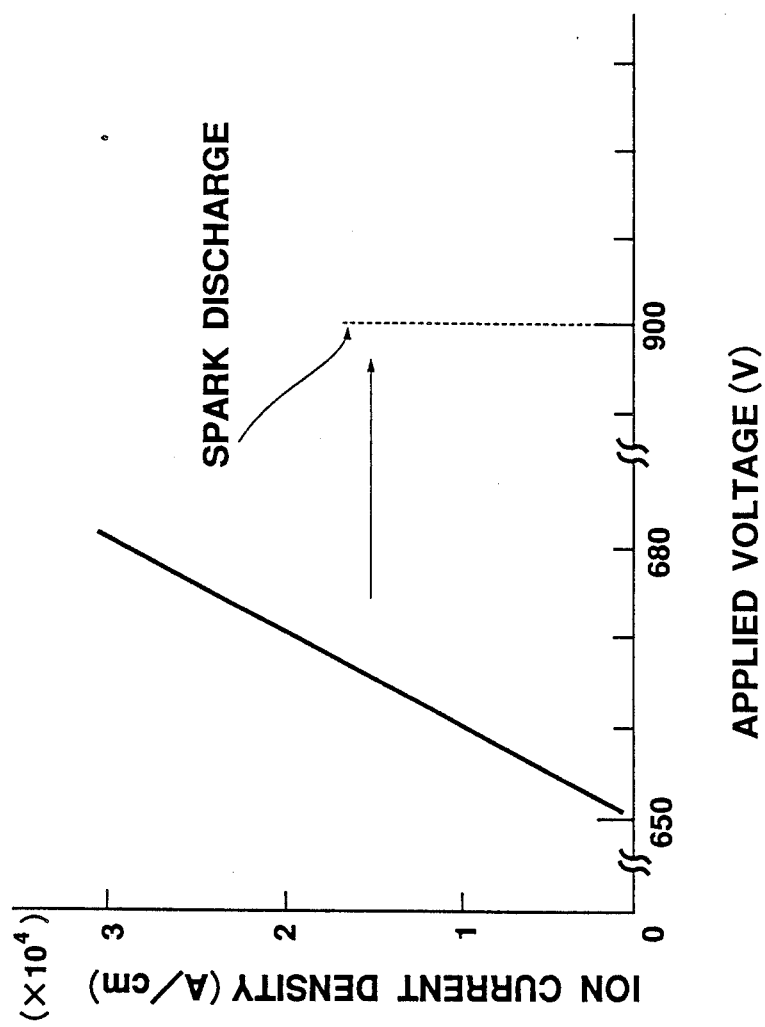
FIG. 4 is a graph of a ion current density versus a control voltage at high humidity condition.
Figure 5:
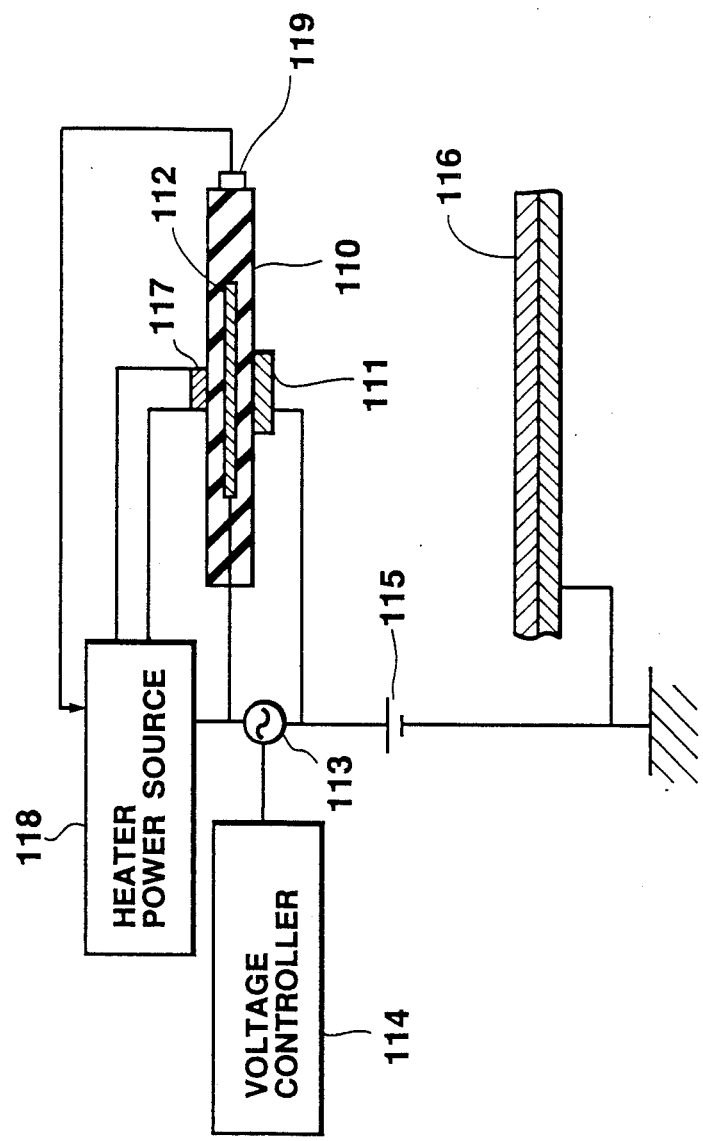
FIG. 5 is a schematic block diagram of a conventional apparatus for generating ions with additional features to cope with the vapor condensation problem.
Figure 6:
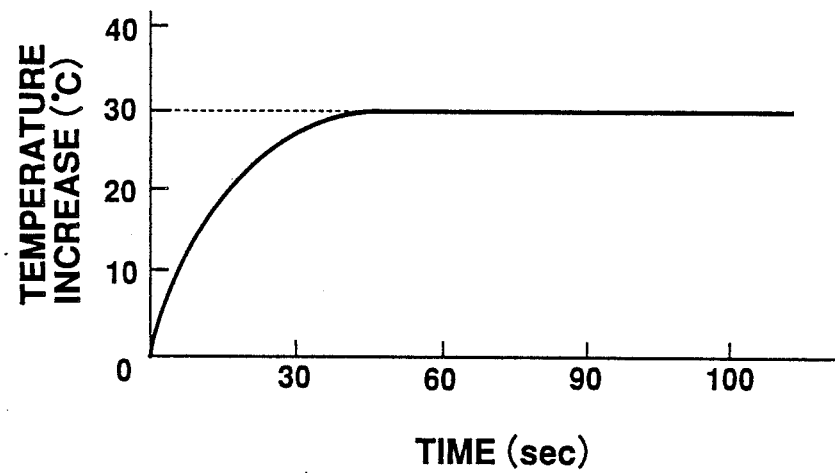
FIG. 6 is a graph of the temperature of the apparatus of FIG. 5 as a function of time.
Figure 7:
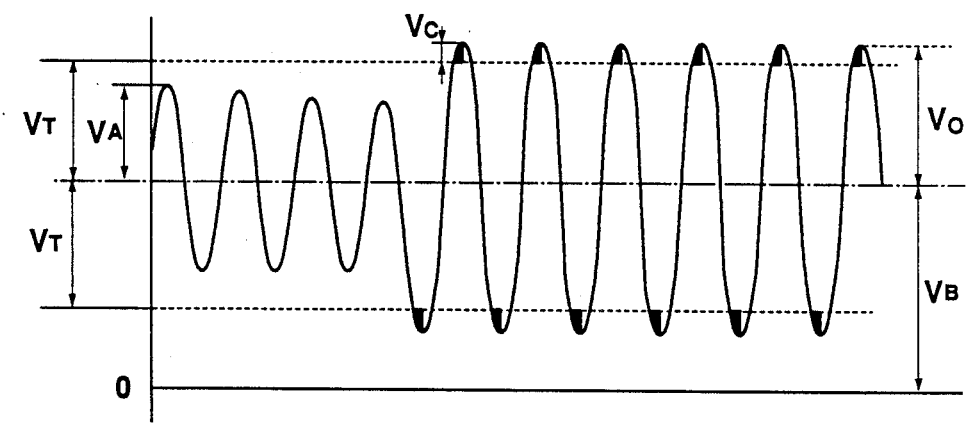
FIG. 7 is a graph of a high frequency voltage and a control voltage to be used in the apparatus of FIG. 5.
Figure 8:
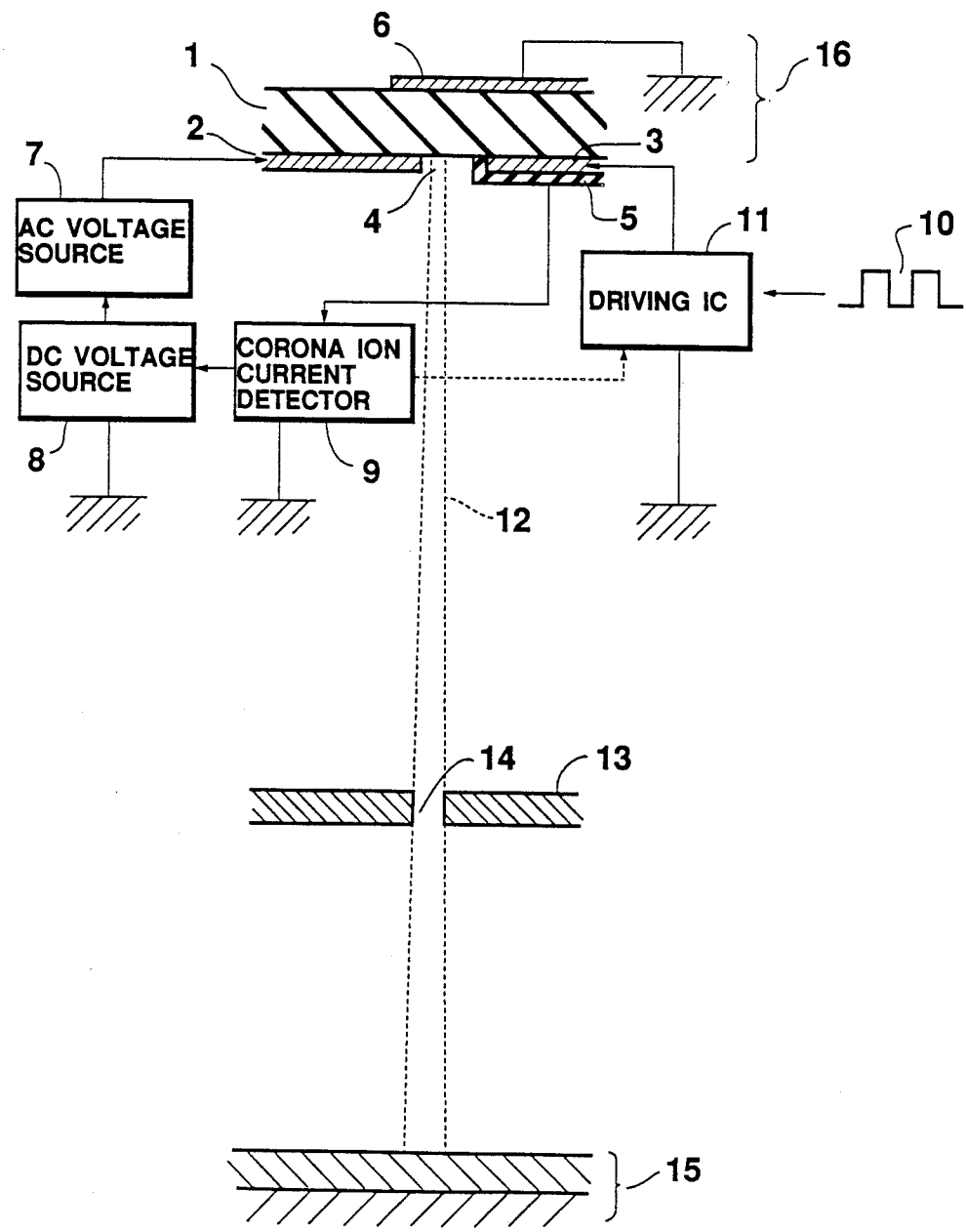
FIG. 8 is a schematic side view diagram of a first embodiment of an apparatus for generating ions according to the present invention.
Figure 9:
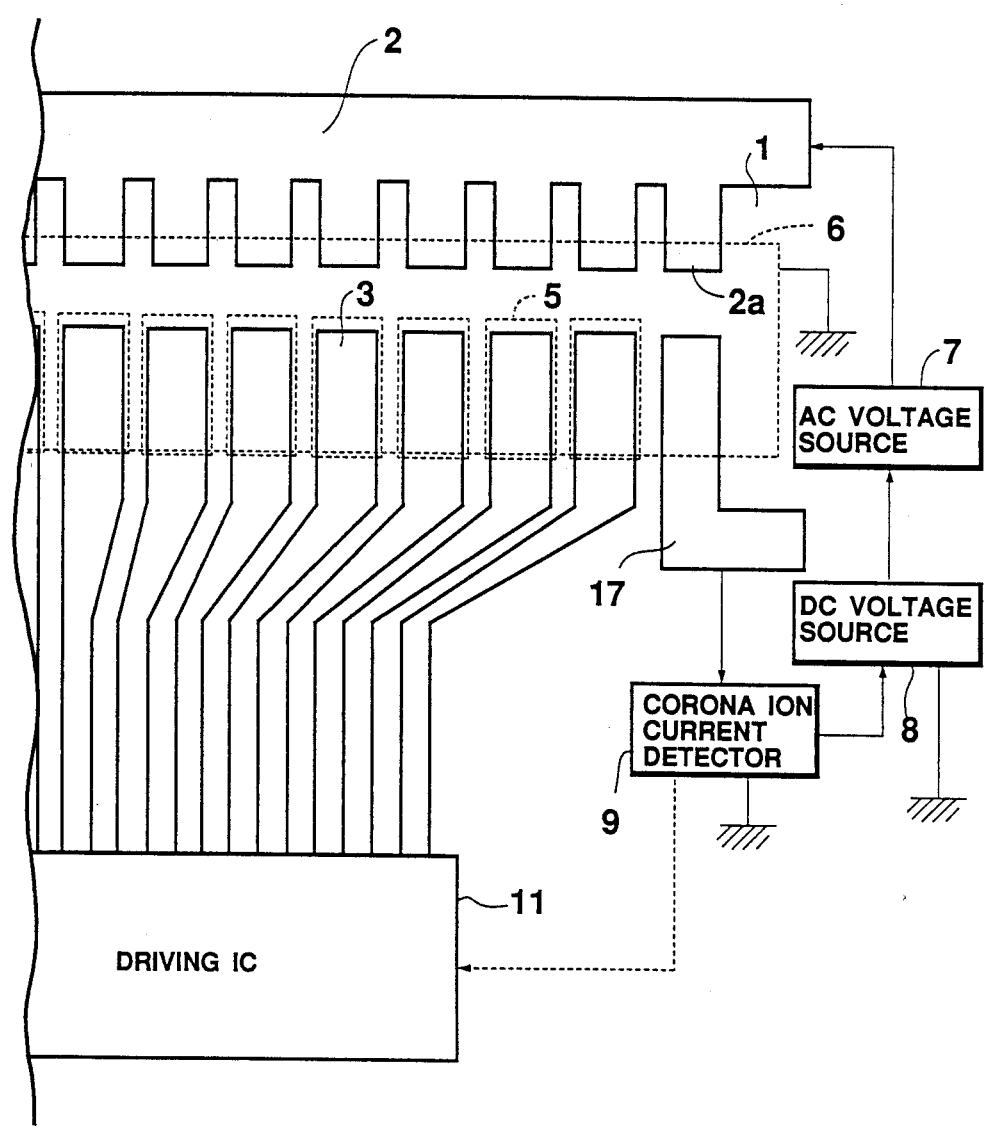
FIG. 9 is a schematic plan view diagram of the apparatus of FIG. 8

Referring now to FIGS. 8 and 9, there is shown a first embodiment of an apparatus for generating ions according to the present invention.

In this embodiment, there is provided an ion recording head 16 comprising a corona ion generation electrode 2 having plurality of terminals each of which is paired with one of signal electrodes 3, provided on one side of an insulative substrate 1 facing toward a recording medium 15, with a gap 4 between each terminal of the corona ion generation electrode 2 and the paired signal electrode 3.

In addition, as shown in FIG. 9, one terminal 2a of the corona ion generation electrode 2 is paired with a corona ion detection electrode 17.

Each signal electrode 3 is covered by an insulative resin 5 made of such material as polyimide and Mylar (trade name), in order to protect a driving IC 11 for the signal electrodes 3 to be described in detail below from a current overflow due to abnormal discharge and other causes.

On the other side of the insulative substrate 1, there is provided an electric field formation electrode 6 which is grounded.

To the corona ion generation electrode 2, an alternating voltage from an AC voltage source 7 and a direct bias voltage from a DC voltage source 8 for raising a peak value of the alternating voltage to a vicinity of level of a critical voltage for corona ion generation are applied.

To the corona ion detection electrode 17, a constant direct voltage is applied so that between the corona ion detection electrode 17 and one terminal 2a of the corona ion generation electrode 2 which is paired with the corona ion detection electrode 17, corona ions are constantly generated.

The DC voltage source 8 is controlled by a signal from a corona ion current detector 9 for detecting currents from the corona ion detection electrode 17, so that the direct bias voltage can be adjusted to stabilize the corona ion generation.

To the signal electrodes 3, signal voltages from the driving IC 11 are applied in response to externally supplied pulse signals 10. The magnitude of the signal voltages is normally equal to that of the constant direct voltage applied to the corona ion detection electrode 17.

The driving IC 11 converts the externally supplied pulse signals 10 given in a form of serial image signal voltages into the signal voltages in a form of parallel image signals which are applied to the signal electrodes 3 at timings given by a clock signal.

The driving IC 11 is also controlled by the signal from the corona ion current detector 9 so as to make the amount of generated corona ion currents constant by changing the magnitude of the signal voltages.

When the appropriate direct bias voltage is applied from the DC voltage source 8 such that a peak value of the alternating voltage from the AC voltage source 7 is raised to a critical voltage level, and the signal voltages are applied from the driving IC 11, the corona ion currents 12 are generated between the corona ion generation electrode 2a and the signal electrodes 3, which subsequently pass through holes 14 on an acceleration electrode 13 to which an appropriate acceleration voltage is applied such that the generated corona ion currents 12 reach the recording medium 15 to form an electrostatic latent image on the recording medium 15.

Figure 10:
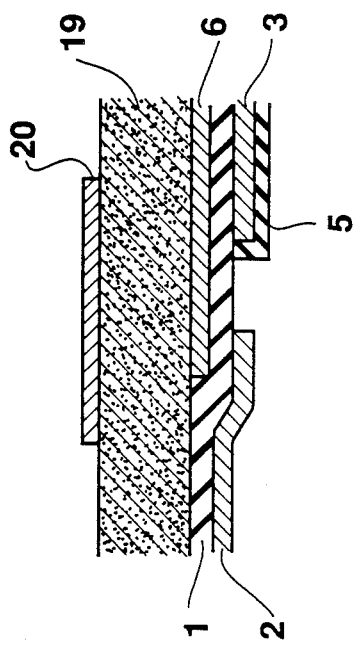
FIG. 10 is an enlarged cross sectional view of an ion recording head of the apparatus of FIG. 8.

To be more specific, in this embodiment, the corona ion generation electrode 2, of 8 microns thickness, made of tungsten, and the signal electrodes 3, of 8 microns thickness, made of tungsten, are arranged on the insulative substrate 1 of 100 micron thickness made of polyimide, with the 100 micron gap 4 between each terminal of the corona ion generation electrode 2 and the paired signal electrode 3. Each terminal of the corona ion generation electrode 2, as well as each of the signal electrodes 3, has a width of 80 micron, and the terminals of the corona ion generation electrode 2 as well as the signal electrodes 3 are arranged with 100 micron intervals. Each of the signal electrodes 3 is covered by the insulative resin 5 of 10 micron thickness made of polyurethane. The electric field formation electrode 6 on the other side of the insulative substrate 1 has a thickness of 8 microns, and is made of tungsten. As shown in FIG. 10, this ion recording head 16 is mounted on a ceramic substrate 19 of 1 mm thickness, and on the other side of this ceramic substrate 19 a heater 20 is attached if necessary. The use of a strong ceramic substrate 19 makes the handling of the apparatus easier.

The acceleration electrode 13 is located 1 mm away from the ion recording head 16 and has as many holes 14 as the number of the signal electrodes 3 each of which are 80 microns in diameter. The recording medium 15 comprises an insulative resin layer of 10 micron thickness covering a conductive body and is located 0.2 mm farther away from the acceleration electrode 13.

The acceleration electrode 13 constantly receives a direct voltage of 150 V, while the corona ion generation electrode 2 is supplied with a constant alternating voltage of 50 kHz frequency and 400 V amplitude which is greater than half of the critical voltage for corona ion generation, but less than the critical voltage itself, along with the variably controlled direct bias voltage.

Figure 11:
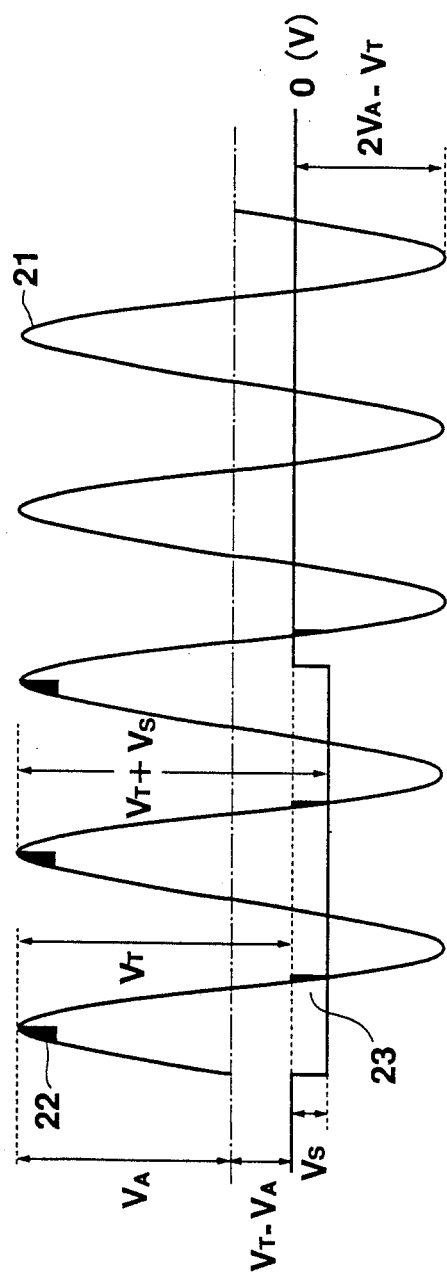
FIG. 11 is a signal form diagram for the alternating voltage and the direct bias voltage to be applied to the corona ion generation electrode and the signal voltages to be applied to the signal electrodes in the apparatus of FIG. 8.

Referring now to FIG. 11, the effects of the alternating voltage and the direct bias voltage to be applied to the corona ion generation electrode 2 and the signal voltages to be applied to the signal electrodes 3 will be explained.

The corona ion generation electrode 2 is supplied with the alternating voltage 21 of the amplitude shown as $V_A$ and the direct bias voltage of the amplitude $V_T - V_A$ such that the peak value of the alternating voltage 21 is at the level of the critical voltage $V_T$ for corona ion generation.

As mentioned above, the amplitude $V_A$ of the alternating voltage 21 is 400 V which is greater than a half of the critical voltage $V_T$ for corona ion generation but less than the critical voltage $V_T$ itself, so that the generation of the corona ions takes place only when the signal voltage $V_S$ of negative polarity is applied to the signal electrodes 3 when the signal voltage $V_S$ is not applied to the signal electrodes 3 the corona ion generation does not take place. In other words, when the signal voltage $V_S$ is not applied to the signal electrodes 3 the electric field in a vicinity of the corona ion generation electrodes 2 is not strong enough for corona ion generation, whereas when the signal voltage $V_S$ is applied to the signal electrodes 3 the electric field between the corona ion generation electrodes 2 and the signal electrodes 3 is strong enough for causing the corona ion generation, as the voltage $V_T + V_S$ which is greater than the critical voltage $V_T$ is applied there.

Thus, when the applied voltage exceeds the critical voltage $V_T$ which are indicated as 22 in FIG. 11, corona ions of positive polarity are generated, as shown in FIG. 12(A).

Most of the corona ions thus generated then move toward the acceleration electrode 13 as corona ion currents 12, but some fraction of the generated corona ions are used for charging up the insulative substrate 1 to the level of the total voltage applied to the corona ion generation electrode 2 so as to assist the acceleration of the corona ion currents 12 moving toward the recording medium 15. Still another fraction of the generated corona ions are used for charging up the insulative resins 5, as shown in FIG. 12(B). The corona ion generation stops when the voltage gap between the corona ion generation electrode 2 and the signal electrodes 3 drops below the critical voltage $V_T$.

Then, when the voltage level of the corona ion generation electrode 2 drops below the zero level which is indicated as 23 in FIG. 11, the voltage gap between the insulative substrate 1 and the corona ion generation electrode 2 becomes greater than the critical voltage $V_T$, so that the generation of the corona ions of negative polarity begins, as shown in FIG. 12(C). These corona ions of negative polarity cancel out the corona ions of positive polarity charging up the insulative substrate 1 and the insulative resins 5 until the ion recording head 16 resumes its initial state as shown in FIG. 12(D). This completes one cycle of the alternating voltage 21. The corona ions of negative polarity also cancel out the excessive corona ions of positive polarity around the ion recording head 16 so as to prevent undesirable widening of the image on the recording medium 15 as well as leakage of the corona ions to the surroundings.

When the signal voltage $V_S$ is stopped, the voltage gap between the corona ion generation electrode 2 and the signal electrodes 3 drops below the critical voltage $V_T$ and corona ion generation stops.

In this manner, while the signal voltage $V_S$ is applied the corona ions are generated many times by the alternating voltage applied to the corona ion generation electrode 2, so that a uniform electrostatic latent image can be obtained on the recording medium 15.

The direct bias voltage to be applied to the corona ion generation electrode 2 must be greater than $V_T - V_A - V_S$ and not greater than $V_T - V_A$ in order for the corona ion generation to take place properly. If the direct bias voltage is less than $V_T - V_A - V_S$ or the amplitude $V_A$ of the alternating voltage 21 is less than a half of the critical voltage $V_T$ the corona ion generation does not take place at all, whereas if the direct bias voltage is greater than $V_T-V_A$ or the amplitude $V_A$ of the alternating voltage 21 is greater than the critical voltage $V_T$ itself the corona ion generation takes place regardless of the presence or absence of the signal voltage $V_S$.

Figure 13:
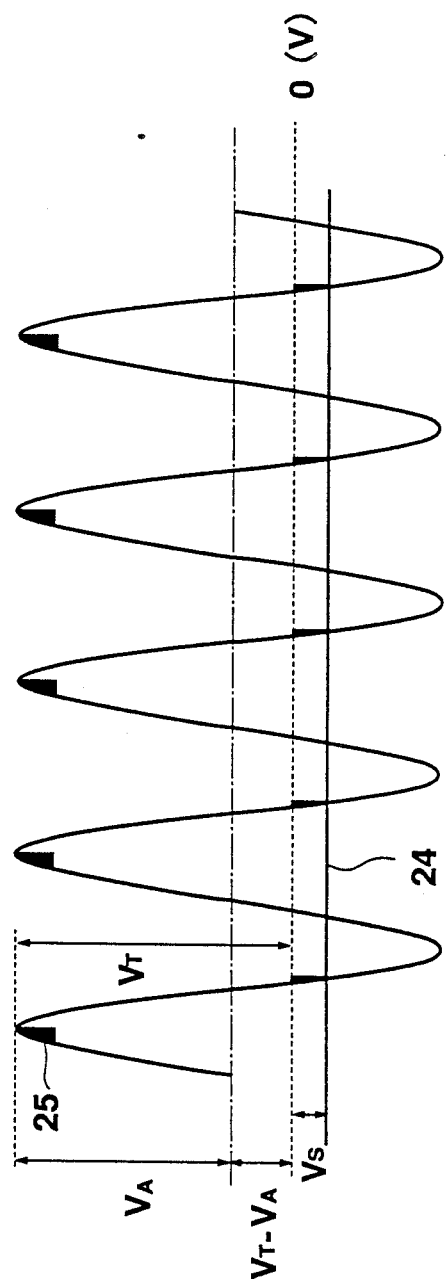
FIG. 13 is a signal form diagram for the alternating voltage and the direct bias voltage to be applied to the corona ion generation electrode and the direct voltage to be applied to the corona ion detection electrode in the apparatus of FIG. 8.
Figure 14:
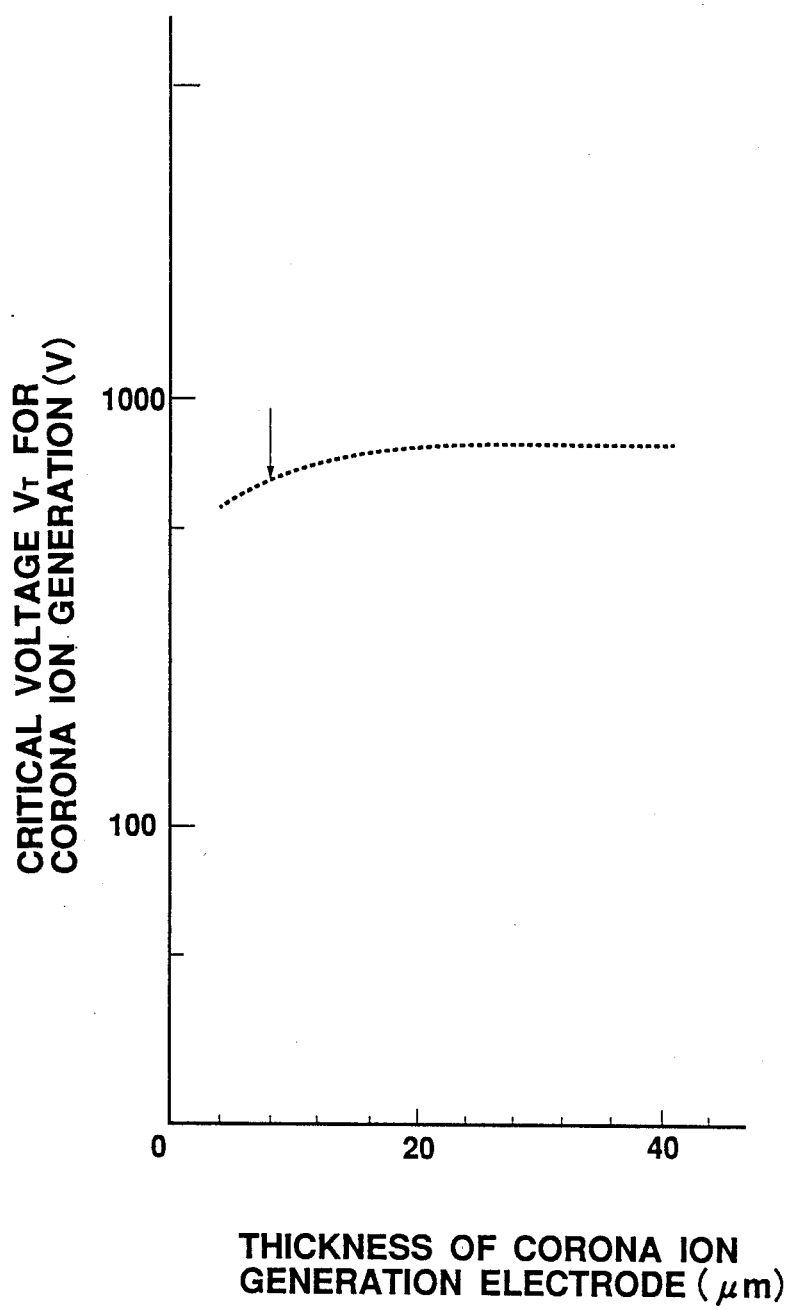
FIG. 14 is a graph of the critical voltage for the corona ion generation versus the thickness of the corona ion generation electrode for the apparatus of FIG. 8.

On the other hand, as shown in FIG. 13, the corona ion detection electrode 17 is applied with the constant direct voltage 24 equal to the signal voltage, so that one terminal 2a of the corona ion generation electrode 2 paired with the corona ion detection electrode 17 continue to generate the corona ions at each peak value of the alternating voltage indicated as 25 in FIG. 13 is applied to the corona ion generation electrode 2.

As already mentioned above, the DC voltage source 8 is controlled by the signal from the corona ion current detector 9 for detecting currents from the corona ion detection electrode 17, so that the direct bias voltage can be adjusted to stabilize the corona ion generation and the driving IC 11 is also controlled by the signal from the corona ion current detector 9 so as to make the amount of generated corona ion currents constant regardless of the environmental conditions of the apparatus.

Specifically, the critical voltage for the corona ion generation $V_T$ and the corona current density I can be approximated using the following formulae given for a corona charger (See R. M. Shaffert "Electrophotography", p. 234, Focal Press, London, 1980):

$$V_T = 31a \cdot \left(1 + \frac{0.308}{\sqrt{a}}\right) \cdot \ln\frac{R}{a} \cdot 1000 \text{ (V)} \quad (3)$$

$$I = 2\mu \cdot \frac{(V_0 + V_S)(V_0 - V_T + V_S)}{R_2 \cdot \ln(R/a)} \cdot 1.11 \times 10^{-12} \text{(A/cm)} \quad (4)$$

where a is a radius of a corona charger wire which is to be approximated by a half of the thickness of the corona ion generation electrode 2, R is a radius of a shielding of a corona charger which is to be approximated by a distance between the corona ion generation electrode 2 and the signal electrode 3 or the electric field formation electrode 6, $V_O$ is an actual voltage applied to the corona ion generation electrode 2, and $\mu$ is the mobility of the corona ions in the air which is approximately equal to 2 cm$^2$/V·sec, A is the corona current. The values of the critical voltage $V_T$ and the current density I obtained by these approximations are plotted in FIG. 15 and FIG. 16, respectively.

Figure 15:
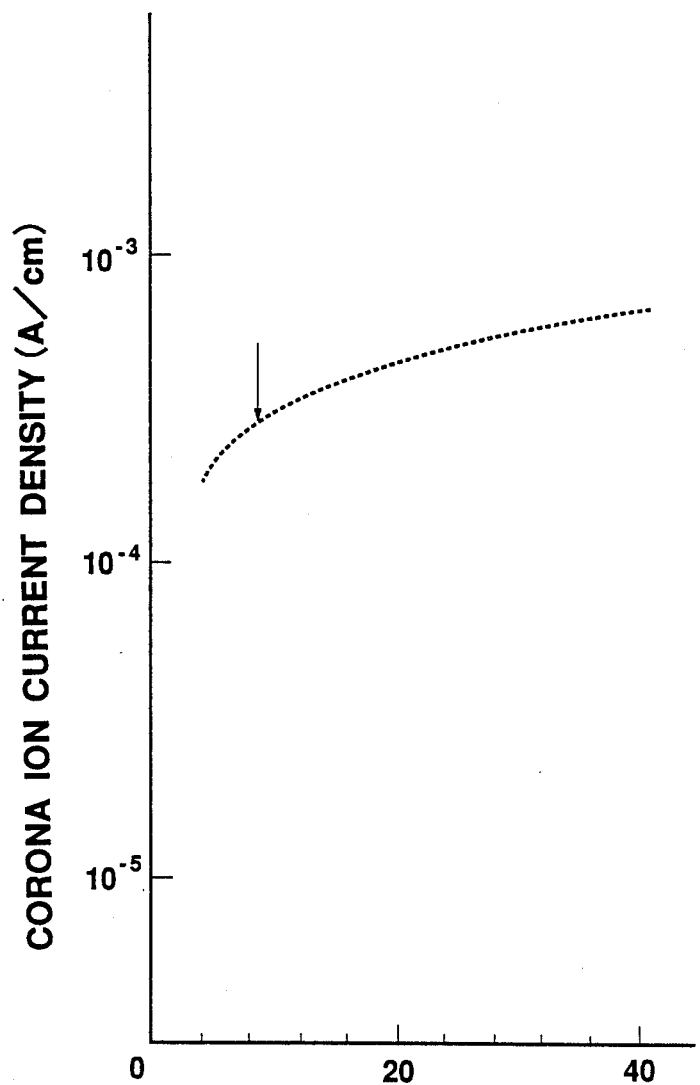
FIG. 15 is a graph of the corona ion current density versus the thickness of the corona ion generation electrode for the apparatus of FIG. 8.
Figure 16:
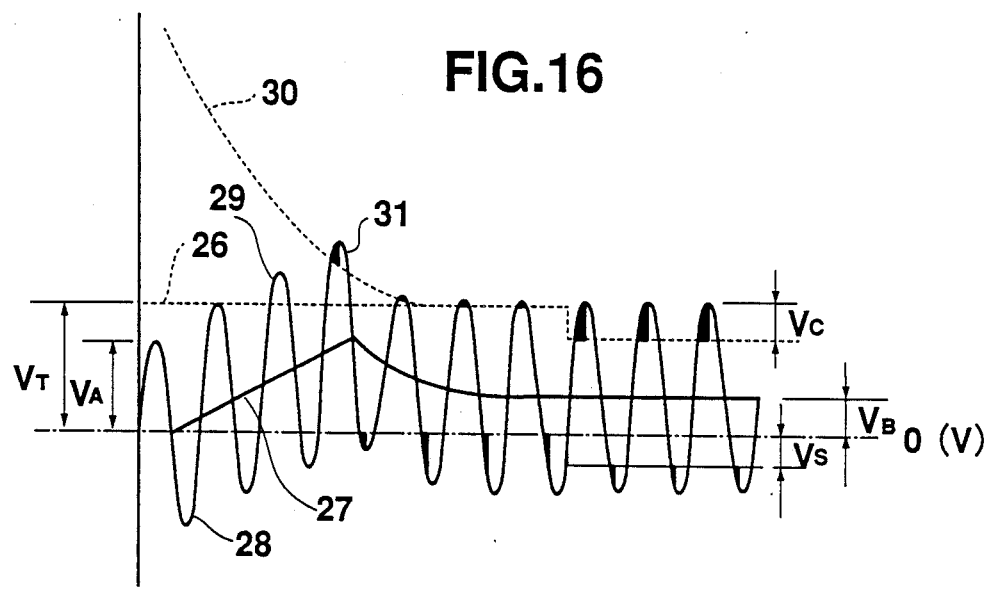
FIG. 16 is a signal form diagram for the alternating voltage and the direct bias voltage to be applied to the corona ion generation electrode and the direct voltage to be applied to the corona ion detection electrode in the apparatus of FIG. 8 in a case in which the critical voltage for the corona ion generation is changed by the change in the environmental conditions of the apparatus.

As indicated by an arrow in FIG. 15, for the apparatus of this embodiment, the critical voltage $V_T$ is approximately 650 V, so that by using the 400 V alternating voltage as described above and the 250 direct bias voltage, when the signal voltage of 30 V is applied to the signal electrodes 3, the corona current of the density approximately equal to $2.8 \times 10^{-4}$ A/cm flows through the corona ion generation electrode 2, as indicated by an arrow in FIG. 16, and the corona ion current 12 passing through the holes 14 of the acceleration electrode 13 in this case is approximately equal to $6.7 \times 10^{-4}$/cm$^2$.

This implies that the recording medium 15 will be charged up to 150 V at 100 $\mu$sec of signal pulse width, which can provide over 200 pages of printing for A4 size paper with a linear ion recording head of 100 micron resolution. During this 100 $\mu$sec of signal pulse width, the peak value of the alternating voltage is applied to the corona ion generation electrode 2 for about five times, within which any irregularity of discharging can be averaged out, so that the uniform electrostatic latent image can be obtained on the recording medium 15.

Also, the time taken by the corona ions to move from the corona ion generation electrode 2 to the recording medium 15 is approximately 10 $\mu$sec, so that the corona ions reach the recording medium 15 in a half of the period of the alternating voltage.

In order to achieve stable electrostatic latent image formation on the recording medium 15, the amount of the generated corona ion currents should be controlled within less than 10% fluctuation. Since the amount of the generated corona ion currents is roughly proportional to the signal voltage, this means 650 V of the total voltage applied to the corona ion generation electrode 2 need to be controlled within 3 V, that is, less than 0.5% fluctuation in applied voltage is required.

For this purpose, at the corona ion current detector 9, the corona ion current of approximately $2.8 \times 10^{-6}$ A from one terminal 2a of the corona ion generation electrode 2 paired with the corona ion detection electrode 17 is applied to an integrating circuit comprising 100 k$\Omega$ resistor and $10^{-9}$ F capacitor of 100 $\mu$sec time constant to produce 0.28 V of voltage and 1/10 of this voltage, i.e., 0.028 V fluctuations are detected, on basis of which the direct bias voltage is controlled within 3 V range around its value of 250 V.

On the other hand, the controlling of the amount of generated corona ion currents within the same 10% fluctuation can be achieved by merely controlling 30 V of the signal voltage within 3 V range.

In these controllings, better accuracy can be achieved by using a larger corona ion detection electrode 17 for which the amount of corona currents is larger.

Referring now to FIG. 16, a case in which the critical voltage for corona ion generation is changed by the environmental conditions of the apparatus will be described.

Here, the critical voltage $V_T$ changes as indicated by a dashed line 26. To cope with such a situation, the direct bias voltage to be applied to the corona ion generation electrode 2 is gradually increased from 0 V as indicated by a solid line 27, so that the peak value of the alternating voltage applied on the corona ion generation electrode 2 starts out from the level below the critical voltage $V_T$ as indicated by 28, and then gradually increased to the level above the critical voltage $V_T$ as indicated by 29 where the corona ion generation can takes place.

The onset of the corona ion generation is monitored through the corona detection electrode 17 and the corona ion current detector 9, and the DC voltage source 8 is controlled to provide an appropriate direct bias voltage for the stable corona ion generation on the basis of this monitoring.

Also, the amount of the corona ion currents is monitored through the corona ion detection electrode 17 to which the direct voltage equal to the signal voltage $V_S$ is applied and the corona ion current detector 9, and the driving IC 11 is controlled to provide an appropriate value of the signal voltage for proper electrostatic latent image formation.

The case in which the vapor condensation on the corona ion generation electrode 2 occurred can be dealt with in a similar manner.

As already mentioned in the description of the background art above, when the vapor condensation on the corona ion generation electrode 2 occurs, no corona ion generation takes place at the ordinary critical voltage. Moreover, in the apparatus such as that of this embodiment, when the applied voltage is kept increased beyond the ordinary critical voltage, at approximately 900 V the insulation by the air is lost and the spark discharge occurs, which in turn causes the breakdown of the electrodes and the driving IC 11.

Now, in this embodiment, the direct bias voltage to be applied to the corona ion generation electrode 2 is gradually increased from 0 V, so that the peak value of the alternating voltage applied to the corona ion generation electrode 2 also gradually increases from its initial value of 400 V which is less than the critical voltage as well as than the voltage for spark discharge, so that initially neither the corona ion generation nor the spark discharge occurs.

Figure 17:
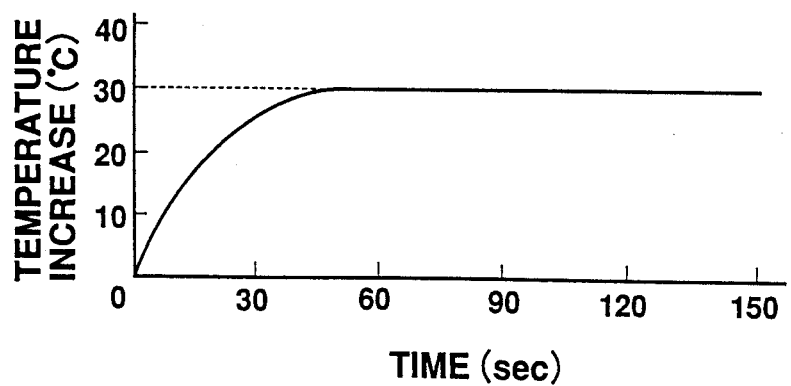
FIG. 17 is a graph of the temperature in the vicinity of the corona ion generation electrode of the apparatus of FIG. 8 as a function of time in a case in which the critical voltage for the corona ion generation is changed by a change in the environmental conditions of the apparatus.

However, by this alternating voltage the induction loss appears in the insulative substrate 1 is lost, so that the temperature in the vicinity of the corona ion generation electrode 2 gradually increases as shown in FIG. 17. As a result, the vapor condensation on the corona ion generation electrode 2 evaporates, and along with this evaporation the critical voltage for the corona ion generation approaches the normal value without vapor condensation as indicated by a dashed line 30 in FIG. 16. The corona ion generation begins when the peak value of the alternating voltage becomes greater than the critical voltage as indicated by 31 in FIG. 16, and the corona ion generation is stabilized subsequently by the controlling of the direct bias voltage to be applied to the corona ion generation electrode 2 as described above and the amount of the corona ion currents is controlled to be constant by controlling the signal voltage to be applied to the signal electrodes 3 as described above.

As described, according to this embodiment, stable corona ion generation can be achieved by controlling the direct bias voltage to be applied to the corona ion generation electrode 2 and the amount of the corona ion currents can be kept at proper amount by controlling the signal voltage to be applied to the signal electrodes 3, both on a basis of monitoring by the corona ion detection electrode 17 and the corona ion current detector 9.

Consequently, it is possible in this embodiment to provide an apparatus for generating ions capable of preventing generation of extraneous corona ions, with which a lifetime of a recording medium can be elongated, which has a simple structure and can be operated by a low control voltage such that a highly compact implementation is realizable.

Furthermore, in the conventional apparatus for generating ions the surface voltage level of the recording medium has been restricted to about 250 V from the strength of the driving IC against high voltage in the apparatus in which a high voltage of 150 V is already used as the signal voltage. As a consequence, the developer for developing the electrostatic latent image on the recording medium has been limited to the conductive one component magnetic toner which can be developed at low voltage level, the transfer of the image has been limited to the thermal roller transfer since the electrostatic transfer has been impossible, the recording medium has been limited to such material as aluminum which can endure high temperature and has a high surface strength, and the color toner has been impossible.

In contrast, in the apparatus of this embodiment, the surface voltage level of the recording medium is not restricted by the requirement from the strength of the driving IC against high voltage since the apparatus is operated with low signal voltage, so that the use of non-magnetic insulative toner, use of color toner, the electrostatic transfer, as well as the use of insulative resin layer for the recording medium become possible.

Moreover, according to this embodiment, it is also possible to provide such an apparatus for generating ions capable of stable corona ion generation and providing constant corona ion currents, regardless of the environmental conditions such as temperature, atmospheric pressure, and humidity.

It is to be noted that the electrostatic latent image may be formed alternatively by applying uniformly a high voltage of negative polarity to the recording medium beforehand, and forming a negative electrostatic latent image by cancelling the negative voltage on the recording medium by the corona ions of positive polarity generated by the apparatus.

Also, the arrangements of the signal electrodes 3 and the electric field formation electrode 6 may be interchanged in the above embodiment.

Furthermore, the apparatus may be further equipped with a heater for heating the ion recording head in order to evaporate the vapor condensation on the corona ion generation electrode, such as those found in the conventional apparatus for generating ions, which can be made to be controllable by incorporating it with the corona ion detection electrode and the corona ion current detector.

Although the above embodiment is described as a corona ion generator using the solidified ion generation substrate, to be used in an electrostatic printer, the present invention also pertains to the controlling of the voltages to be applied to a corona ion generation electrode and a signal electrode by using a corona ion detection electrode and a corona ion current detector, and that provides for a gradual increase of direct bias voltage to evaporate any vapor condensation on the corona ion generation electrode along with other uses of the apparatus for generating ions, such as a charger for an electrophotographic recording apparatus.

Figure 18:
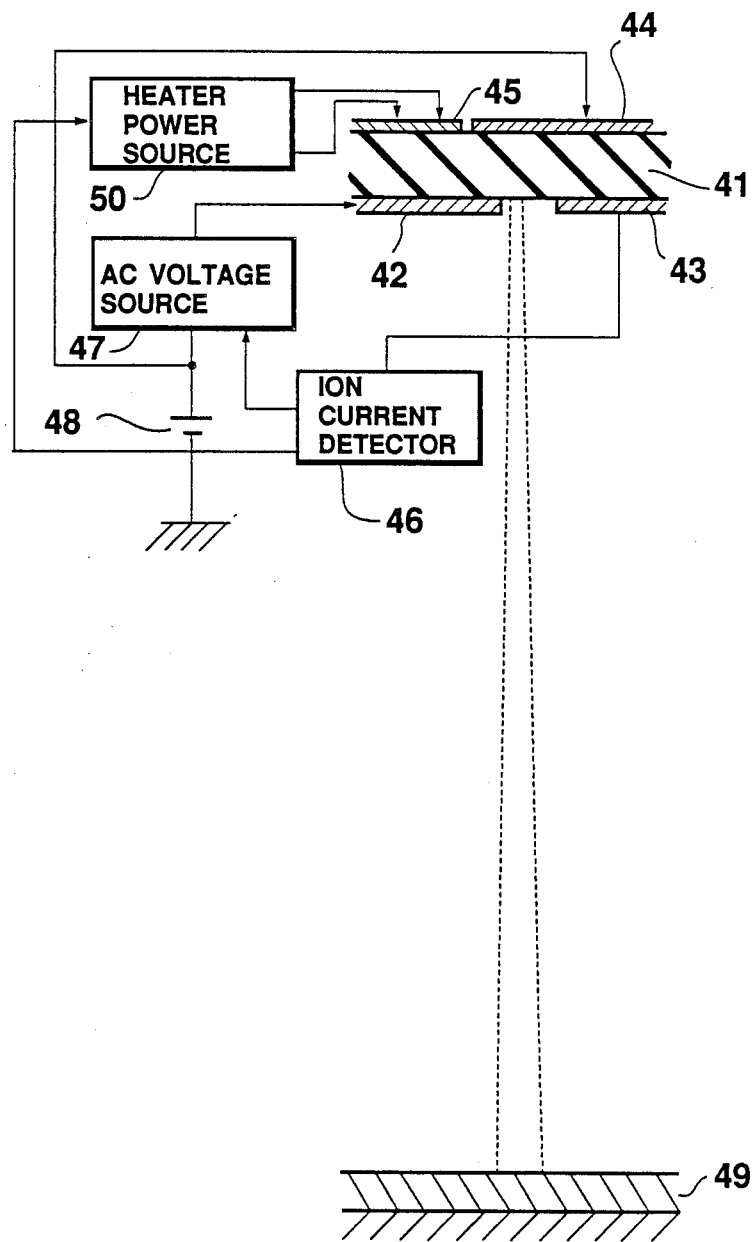
FIG. 18 is a schematic side view diagram of a second embodiment of an apparatus for generating ions according to the present invention.

As an example of such an application of the present invention, referring now to FIG. 18 a second embodiment of the present invention will now be described with references to FIG. 18.

Here, the apparatus for generating ions is used as a charger for an electrophotographic recording apparatus.

In this second embodiment, a corona ion generation electrode 42 and a corona ion detection electrode 43 are provided on one side of an insulative substrate 41 facing toward a recording medium 49.

On the other side of the insulative substrate 41, an induction electrode 44 and a heater 45 are provided.

To the corona ion generation electrode 42, an alternating voltage from an AC voltage source 47 is applied. The AC voltage source 47 is controlled by a signal from an ion current detector 46 for detecting currents from the corona ion detection electrode 43, such that the alternating voltage is gradually increased from zero as described in detail below.

In addition, the AC voltage source 47 and the induction electrode 44 are applied with a direct bias voltage from a DC voltage source 48 for raising a peak value of the alternating voltage to a vicinity of level of a critical voltage for corona ion generation. Also, the polarity of this direct bias voltage determines the polarity of the ions to be generated from the corona ion generation electrode 42 and to be radiated on the recording medium 49.

The heater 45 is controlled by a heater power source 50 which in turn is also controlled by a signal from an ion current detector 46 for detecting currents from the corona ion detection electrode 43, so as to heat up the corona ion generation electrode 42 in a manner to be described below.

To be more specific, in this second embodiment, the corona ion generation electrode 42, of 20 micron thickness, made of tungsten, and the signal electrodes 3, of 8 micron thickness are mounted on the insulative substrate 41 of 10 micron thickness made of polyimide. The recording medium 49 is placed 1 mm away from the apparatus, and the alternating voltage applied to the corona ion generation electrode 42 is of 100 kHz, while the direct bias voltage applied to the AC voltage source 47 and the induction electrode 44 is 600 V of positive polarity.

Figure 19:
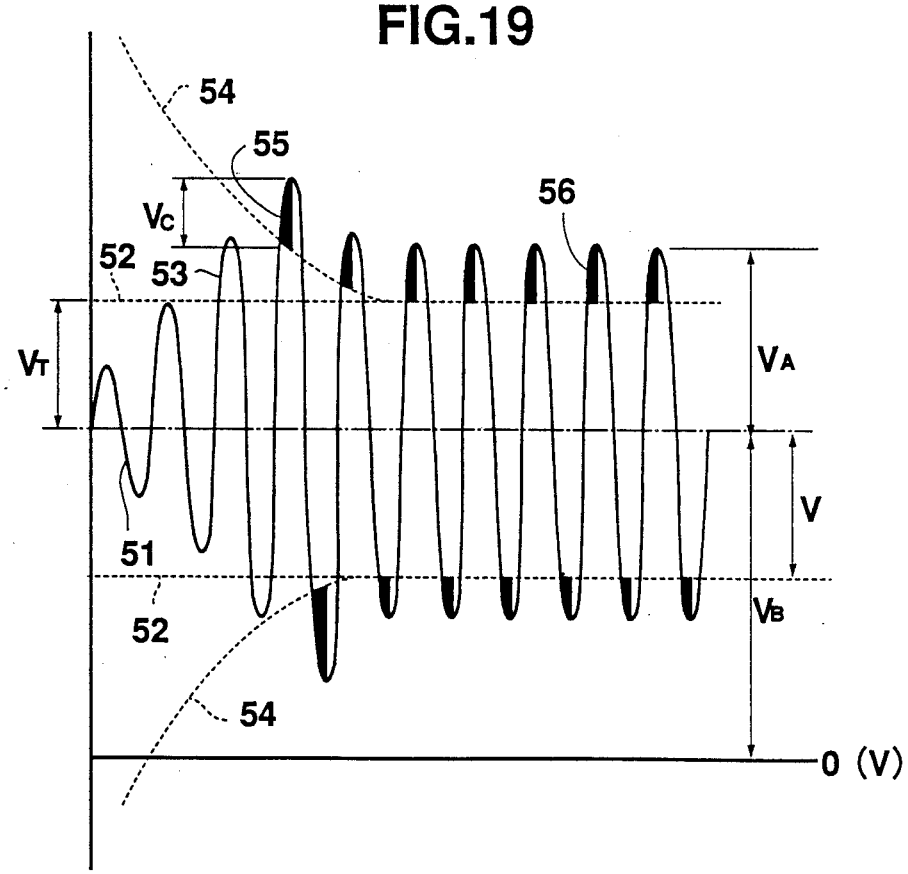
FIG. 19 is a signal form diagram for the alternating voltage and the direct bias voltage to be applied to the corona ion generation electrode and the direct voltage to be applied to the corona ion detection electrode in the apparatus of FIG. 18 in a case in which the critical voltage for the corona ion generation is changed by the change in the environmental conditions of the apparatus.

As shown in FIG. 19, the alternating voltage 51 of amplitude $V_A$ to be applied to the corona ion generation electrode 42 is gradually increased from zero, so that the corona ion generation begins when the peak value of the alternating voltage 51 biased by the direct bias voltage $V_B$ exceeds the critical voltage $V_T$ for the corona ion generation. When there is no vapor condensation on the corona ion generation electrode 42, the critical voltage $V_T$ is as indicated by a dashed line 52, so that the corona ion generation begins with the peak indicated as 53 in FIG. 19.

As a result, the corona ion current is detected at the corona ion detection electrode 43, on a basis of which the AC voltage source 47 is controlled by the ion current detector 46 such that the corona ion current at the corona ion detection electrode 43 is at a predetermined desired level.

Figure 20:
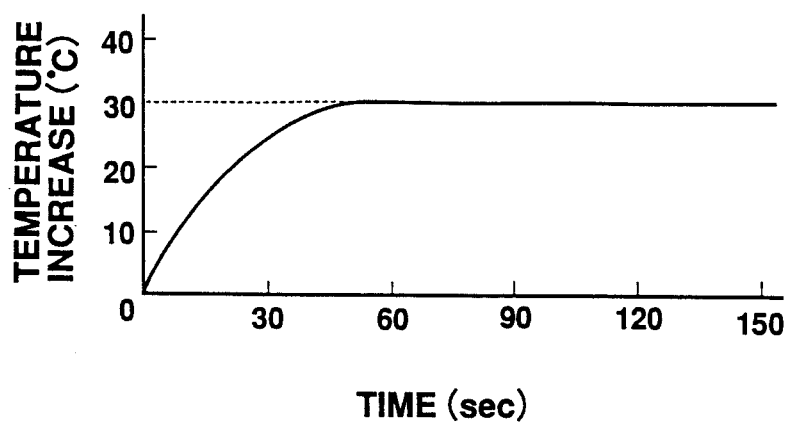
FIG. 20 is a graph of the temperature in the vicinity of the corona ion generation electrode of the apparatus of FIG. 18 as a function of time in a case in which the critical voltage for the corona ion generation is changed by the change in the environmental conditions of the apparatus.

When the vapor condensation is present on the corona ion generation electrode 42, the alternating voltage 51 of amplitude $V_A$ to be applied to the corona ion generation electrode 42 is gradually increased from zero as before. In this case, the induction loss appears in the insulative substrate 41, so that the temperature in the vicinity of the corona ion generation electrode 42 gradually increases as shown in FIG. 20. As a result, the vapor condensation on the corona ion generation electrode 42 evaporates, and along with this evaporation the critical voltage for the corona ion generation approaches the normal value without vapor condensation as indicated by a dashed line 54 in FIG. 19. The corona ion generation begins when the peak value of the alternating voltage becomes greater than the critical voltage as indicated by 55 in FIG. 19, and the corona ion generation is stabilized subsequently as indicated by 56 in FIG. 19 by the controlling of the alternating voltage to be applied to the corona ion generation electrode 2 as described above.

The increase in temperature in the vicinity of the corona ion generation electrode 42 shown in FIG. 20 is given by the equation:

$$T \cdot \rho \cdot v \cdot c = \frac{\epsilon \omega t}{4.18} \cdot \frac{A}{d} \cdot V^2 \cdot \tan\delta \qquad (5)$$

where $\rho$ is a specific weight, $v$ is a volume, c is a specific heat, $\epsilon$ is a dielectric constant, $\omega$ is an angular frequency, t is a time, A is a size of the electrode, d is a distance between the electrodes, V is a voltage, and $\tan\delta$ is induction loss. For 100 kHz alternating voltage, increase of 250 in the corona ion generation electrode 42 takes roughly 60 sec as shown in FIG. 20. This heating up can be made faster by operating the heater 45 in accordance with the ion current detector 46.

Also, even when the alternating voltage is very high with respect to the critical voltage when the vapor condensation is completely evaporated, the alternating voltage can quickly be adjusted by the ion current detector 46 to an appropriate level.

It is to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for generating ions, comprising:
   first electrode means for generating ions;
   first voltage source means for applying to the first electrode means a first voltage slightly less than a critical voltage for constant ion generation;
   second electrode means for starting ion generation by the first electrode means, which is located in a vicinity of the first electrode means with a gap therebetween; and
   second voltage source means for applying to the second electrode means a second voltage significantly less than the first voltage, but having such an amplitude that a total of the first and the second voltages exceeds the critical voltage, such that ion generation by the first electrode means takes place only while the second voltage is being applied to the second electrode means.

2. The apparatus of claim 1, wherein the second voltage is applied with a prescribed pulse width, and wherein the first voltage source means comprises:
   an alternating voltage source for applying an alternating voltage having a period significantly shorter than the pulse width of the second voltage; and
   a direct voltage source for applying a direct bias voltage.

3. The apparatus of claim 2, further comprising:
   additional electrode means for detecting an amount of ions generated by the first electrode means, which is located in a vicinity of the first electrode means with the same gap as the gap between the first and second electrode means, to which a third voltage greater than the critical voltage is applied; and
   means for controlling the direct voltage source of the first voltage source means and the second voltage source means in accordance with the amount of ions detected by the additional electrode means such that the first voltage and the second voltage have amplitudes appropriate for a prescribed desired ion generation by the first electrode means.

4. The apparatus of claim 3, wherein the direct voltage source increases the second voltage gradually from zero to an appropriate amplitude specified by the controlling means.

5. The apparatus of claim 4, further comprising a heater means for heating the first electrode means, and wherein the controlling means also controls the heater means in accordance with the amount of ions detected by the additional electrode means such that a prescribed desired ion generation is obtained by the first electrode means.

6. The apparatus of claim 1, wherein the second electrode means is covered by an insulative resin.

7. The apparatus of claim 1, wherein the first and the second electrode means are mounted on an insulative substrate.

8. The apparatus of claim 1, further comprising a third electrode means for defining a ground level for the first and the second voltages.

9. An apparatus for generating ions, comprising:
first electrode means for generating ions;
first voltage source means for applying, to the first electrode means, a first voltage;
second electrode means for controllably starting the ion generation by the first electrode means, which is located in a vicinity of the first electrode means with a gap therebetween;
second voltage source means for applying to the second electrode means a second voltage having such an amplitude that a total of the first and the second voltages exceeds a critical voltage for ion generation, such that ion generation by the first electrode means takes place only when the second voltage is being applied to the second electrode means;
additional electrode means for detecting an amount of ions generated by the first electrode means, which is located in a vicinity of the first electrode means with the same gap as the gap between the first and second electrode means, to which a third voltage greater than the critical voltage is applied; and
means for controlling the direct voltage source of the first voltage source means and the second voltage source means in accordance with the amount of ions detected by the additional electrode means such that the first voltage and the second voltage have amplitudes appropriate for a prescribed desired ion generation by the first electrode means.

10. An apparatus for generating ions, comprising:
first electrode means for generating ions;
first voltage source means for applying to the first electrode means a first voltage, comprising;
an alternating voltage source for applying an alternating voltage; and
a direct voltage source for applying a direct bias voltage such that the direct bias voltage gradually increases from zero to an appropriate amplitude;
second electrode means for starting the ion generation by the first electrode means, which is located in a vicinity of the first electrode means with a gap therebetween; and
a second voltage source means for applying, to the second electrode means, a second voltage having such an amplitude that a total of the first and the second voltages exceeds a critical voltage for ion generation such that the ion generation by the first electrode means takes place only when the second voltage is being applied to the second electrode means.

* * * * *